(12) United States Patent
Park et al.

(10) Patent No.: US 8,547,361 B2
(45) Date of Patent: Oct. 1, 2013

(54) INPUT METHOD AND SYSTEM USING OPTICAL POINTER FOR ELECTRONIC DEVICE

(75) Inventors: Yong Gook Park, Yongin-si (KR); Min Kyu Park, Seongnam-si (KR); Hyun Jin Kim, Seoul (KR); Hee Jeong Choo, Anyang-si (KR); Hyun Ki Kim, Seoul (KR); Eun Young Lim, Seoul (KR); Soo Yeoun Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 727 days.

(21) Appl. No.: 12/635,238

(22) Filed: Dec. 10, 2009

(65) Prior Publication Data
US 2010/0149135 A1 Jun. 17, 2010

(30) Foreign Application Priority Data
Dec. 11, 2008 (KR) ........................ 10-2008-0126027

(51) Int. Cl.
*G06F 3/033* (2013.01)

(52) U.S. Cl.
USPC ......................................................... 345/179

(58) Field of Classification Search
None
See application file for complete search history.

(56) References Cited

U.S. PATENT DOCUMENTS

| | | | | |
|---|---|---|---|---|
| 5,793,361 A * | 8/1998 | Kahn et al. | .................... | 345/179 |
| 6,600,478 B2 * | 7/2003 | White et al. | .................. | 345/157 |
| 7,499,027 B2 * | 3/2009 | Brigham et al. | ............. | 345/158 |
| 2006/0139334 A1 * | 6/2006 | Van Delden et al. | ......... | 345/173 |
| 2009/0265670 A1 * | 10/2009 | Kim et al. | ..................... | 715/863 |

* cited by examiner

*Primary Examiner* — Jason Olson
(74) *Attorney, Agent, or Firm* — H.C. Park & Associates, PLC

(57) ABSTRACT

An input method for an electronic device and a related input system are provided. When an optical pointer irradiates light rays with a specific pattern, photo sensors disposed in a display unit of the device detect the irradiated light rays. The device determines and generates pattern information corresponding to a pattern of the light rays, a pattern direction, and a pattern movement. The device executes or controls a function according to the pattern information and a function table, which maps the pattern information to the function.

16 Claims, 10 Drawing Sheets

INPUT METHOD AND SYSTEM USING OPTICAL POINTER FOR ELECTRONIC DEVICE

CROSS REFERENCE TO RELATED APPLICATION

This application claims priority from and the benefit of Korean Patent Application No. 10-2008-0126027, filed on Dec. 11, 2008, which is hereby incorporated by reference for all purposes as if fully set forth herein.

BACKGROUND OF THE INVENTION

1. Field of the Invention

Exemplary embodiments of the present invention relate to a method and system for entering an input signal in an electronic device using an optical pointer.

2. Description of the Background

Electronic devices such as mobile communication devices may be able to perform several functions and operations such as, for example, a voice calling function, a music playback function, an image capturing function (e.g., camera), and gaming functions.

A touch screen may be used as a display unit and/or an input unit in several electronic devices. Touch screens may offer a much more intuitive, user-friendly interface to a user of the electronic device. A conventional electronic device with a touch screen may, however, have a shortcoming in that the user has to directly touch a surface of the touch screen to manipulate the electronic device. For example, an input technique in a conventional electronic device may always require a user's touch on the touch screen.

BRIEF SUMMARY OF THE INVENTION

Exemplary embodiments of the present invention provide a method and system to enter an input signal in an electronic device by using an optical pointer that irradiates light rays onto a display unit having photo sensors.

Additional features of the invention will be set forth in the description which follows, and in part will be apparent from the description, or may be learned by practice of the invention.

Exemplary embodiments of the present invention provide an input method for an electronic device. The method includes detecting at least one of a pattern, a pattern direction, and a pattern movement corresponding to light signals transmitted from an optical pointer, on a display unit. The method further includes referencing a function table providing a mapping between a function of the device and pattern information associated with the at least one of the pattern, the pattern direction, and the pattern movement, and executing the function according to the pattern information and the function table.

Exemplary embodiments of the present invention also provide an input system for an electronic device. The system includes an optical pointer and a device. The optical pointer is configured to transmit light signals. The device is configured to detect at least one of a pattern, a pattern direction, and a pattern movement corresponding to the light signals transmitted from the optical pointer. The device is configured to reference a function table providing a mapping between a function of the device and pattern information associated with the at least one of the pattern, the pattern direction, and the pattern movement. The device is configured to execute or control the function according to the pattern information and the function table.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
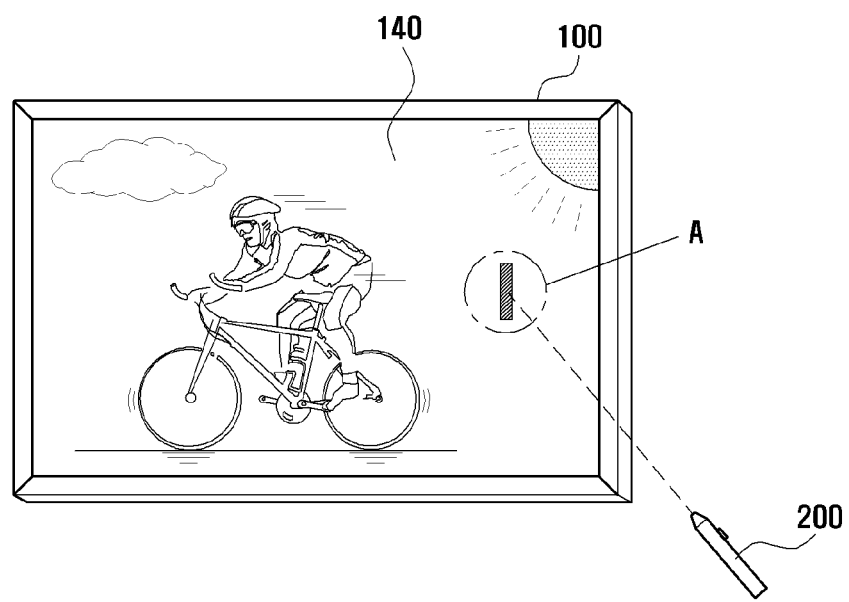
FIG. 1 is a view that schematically illustrates a configuration of an input system for an electronic device according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, well known or widely-used techniques, elements, structures, and processes may not be described or illustrated in detail to avoid obscuring the essence of the present invention. Hereinafter, exemplary embodiments of the present invention are described in detail with reference to the accompanying drawings.

Figure 2:
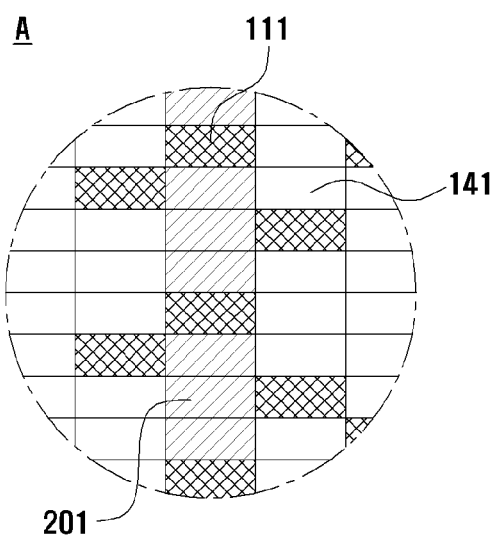
FIG. 2 is an enlarged view of section 'A' in FIG. 1 according to exemplary embodiments of the present invention.

FIG. 1 is a view that schematically illustrates a configuration of an input system for an electronic device according to exemplary embodiments of the present invention. FIG. 2 is an enlarged view of a section 'A' in FIG. 1.

Referring to FIG. 1 and FIG. 2, the input system may include an electronic device 100 and an optical pointer 200. The device 100 may include a display unit 140 having a plurality of photo sensors 111 therein. The optical pointer 200 may be configured to irradiate light rays with a specific pattern.

When the optical pointer 200 irradiates light rays with a specific pattern onto a partial region of the display unit 140, the device 100 may recognize the irradiated pattern and may then execute a function corresponding to the recognized pattern.

The device 100 may output, on the display unit 140, contents stored in a memory unit or received from another communication device through an interface unit. Furthermore, the device 100 may detect light rays irradiated from the optical pointer 200 with a specific pattern on a partial region of the display unit 140. Depending on the pattern of light rays, the device 100 may execute a corresponding function such as, for example, a menu function. The display unit 140 may have photo sensors 111 disposed regularly between pixels 141 arranged in a matrix form, as shown in FIG. 2. When a certain optical irradiation pattern 201 is formed on at least some of the photo sensors 111, corresponding photo sensors 111 may generate sensing signals in response to the pattern 201 and may then transmit the sensing signals to a control unit. After receiving the sensing signals, the control unit 160 of the device 100 may recognize the optical irradiation pattern on the display unit 140, compare the recognized pattern with patterns associated with predefined functions, and execute a predefined function having a pattern matching the recognized pattern.

The optical pointer 200 may irradiate light rays, and may irradiate light rays with a specific pattern according to the user's manipulation. The optical pointer 200 may move according to the user's position while the light rays are being irradiated. A user may select a specific pattern from among a plurality of patterns for being implemented by the optical pointer 200.

Figure 3:
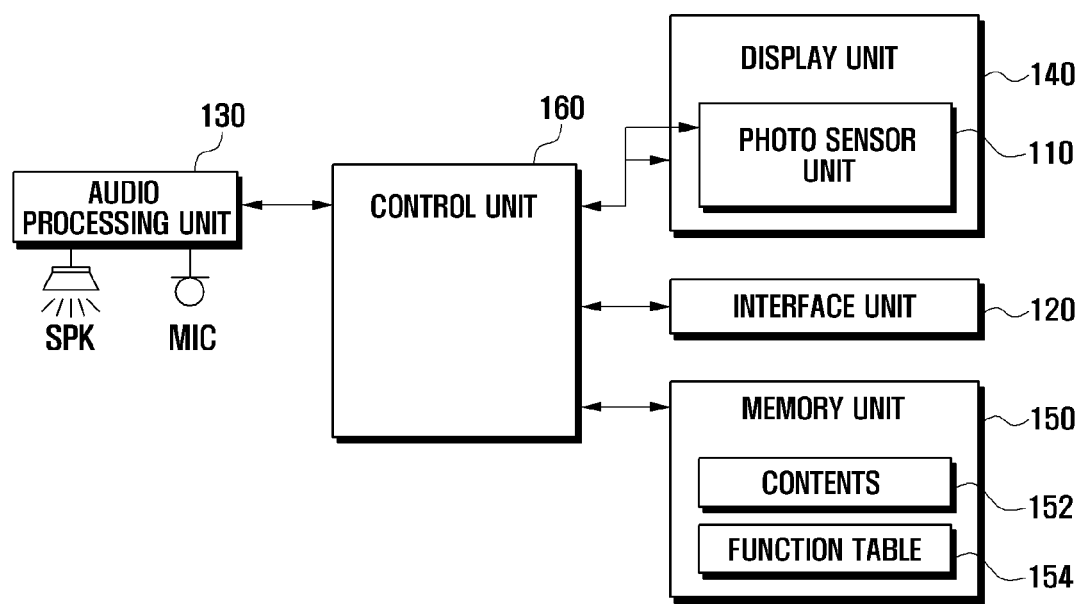
FIG. 3 is a block diagram illustrating a configuration of an electronic device according to exemplary embodiments of the present invention.

FIG. 3 is a block diagram illustrating a configuration of an electronic device 100 according to exemplary embodiments of the present invention.

Referring to FIG. 3, the device 100 may include a photo sensor unit 110, an interface unit 120, an audio processing unit 130, a display unit 140, a memory unit 150, and a control unit 160.

The photo sensor unit 110 of device 100 may detect and recognize a light irradiation pattern irradiated from the optical pointer 200. The photo sensor unit 110 may be disposed on the display unit 140, and may send a signal to the control unit 160 to execute a function corresponding to the detected pattern.

The photo sensor unit 110 may be a sensor array which detects light rays irradiated from another device or a shadow formed according to light irradiation. The photo sensor unit 110 may detect light rays from the optical pointer 200 and may then transmit a corresponding signal to the control unit 160. As discussed above with reference to FIG. 2, the photo sensor unit 110 may have a plurality of photo sensors 111 disposed at regular intervals on the front of the display unit 140. The photo sensors may be arranged in a matrix form to precisely detect a light irradiation pattern. When the optical pointer 200 irradiates light rays onto a region of the display unit 140, the photo sensors disposed in the region may transmit location information to the control unit 160. The photo sensors of the photo sensor unit 110 may be disposed between pixels in the display unit 140 and may not respond and/or detect light rays emitted from the display unit 140. If the optical pointer 200 irradiates infrared rays, the photo sensor unit 110 may be composed of sensors suitable for detecting the infrared rays.

The interface unit 120 may provide a communication path to and from other devices or memory chips. If the device 100 supports wireless communication, the interface unit 120 may be a radio frequency unit. If the device 100 supports serial communication, the interface unit 120 may be a Universal Serial Bus (USB) interface or a Universal Asynchronous Receiver/Transmitter (UART) interface. The interface unit 120 may establish a communication channel with other devices, memory chips, mobile communication systems, or internet network, and may receive contents through the communication channel. Additionally, the interface unit 120 may be a broadcast receiving module, which receives broadcast programs from a broadcasting network and sends the received broadcast programs to the control unit 160.

The audio processing unit 130 may receive audio signals from the control unit 160 and may output audible sounds through a speaker (SPK). The audio processing unit 130 may also receive audio signals from a microphone (MIC) and may output audio data of the received audio signals to the control unit 160. When the optical pointer 200 irradiates a light pattern on the photo sensor unit 100 on the display unit 140, the audio processing unit 130 may output an alarm under the control of the control unit 160.

The display unit 140 may output various scenes or graphical data on a screen in response to execution of functions in the device 100. For example, the display unit 140 may display a booting screen, an idle screen, a menu screen, or any other suitable screen in response to execution of a function or contents. The display unit 140 may be formed of a liquid crystal display (LCD), an organic light emitting device (OLED), a projector, or any other display mechanism. The display unit 140 may include a panel driver, a frame memory for storing data, and a display device. The display unit 140 may have a large number of pixels arranged in all regions except regions where the photo sensor unit 110 is disposed.

The memory unit 150 may store a variety of application programs required for operating the device 100. The memory unit 150 may store contents 152 received from other devices and/or servers. The memory unit 150 may include a program region and a data region.

The program region may store an operating system (OS) for booting the device 100, and application programs for various functions of the device 100, such as, for example, a voice call, a video call, a file play, a menu selection, a contents search, a broadcast watching, a message service, and a web browser. The program region may store an operating program for the photo sensor unit 110. When the device 100 is enabled, the OS may be activated according to predefined conditions or a user's request.

The data region may store data generated while the device is being used. For example, the data region may store the user's data (e.g., still and moving images acquired by a camera, phonebook data, audio data, and any other user-related data) related to various optional functions. The data region may store a plurality of contents 152 received from other devices or systems through the interface unit 120. The contents 152 may include, for example, images, documents, music files, sound files, video files, e-books, and/or games. The data region may store a function table 154, which may define the execution of functions by the device 100 depending on the patterns irradiated on the photo sensor unit 110 by the optical pointer 200. For example, the function table 154 may include instructions to output a predefined content or to output contents in a predefined way when light rays with a predefined pattern are irradiated on the photo sensor unit 110 in the display unit 140.

Figure 4:
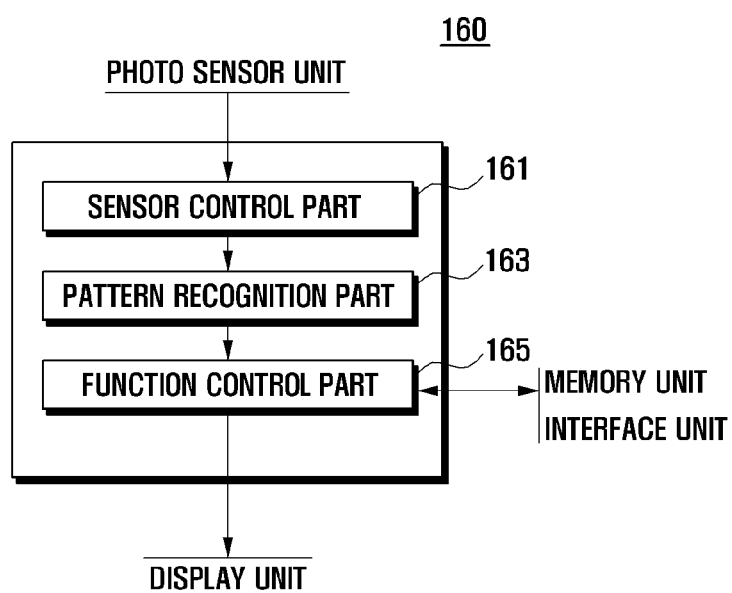
FIG. 4 is a block diagram illustrating a detailed configuration of the control unit shown in FIG. 3 according to exemplary embodiments of the present invention.

The control unit 160 may control the power supply, the activation of each component of the device 100, and signal flows between the respective components. The control unit 160 may control the photo sensor unit 110 to operate selectively according to the user's request. The control unit 160 may control execution of functions corresponding to the recognized pattern based on the function table 154. In some cases, the control unit 160 may include a sensor control part 161, a pattern recognition part 163, and a function control part 165, as shown in FIG. 4.

The sensor control part 161 may monitor the photo sensor unit 110 and may detect the photo sensors responding to light rays irradiated from the optical pointer 200. The sensor control part 161 may transmit information on locations of the detected photo sensors to the pattern recognition part 163. In some cases, the sensor control part 161 may transmit information about the locations of photo sensors responding to the movement of the optical pointer 200. For example, first location information associated with the location of photo sensors initially receiving light rays irradiated from the optical pointer 200 may be transmitted to the pattern recognition part 163 from the sensor control part 161. Subsequently, second location information associated with the location of photo sensors responding to movement of the optical pointer may be transmitted to the pattern recognition part 163 from the sensor control part 161.

The sensor control unit 161 may control an enabling time of the photo sensor unit 110 and may control the supply and cutoff of power to the photo sensor unit 110. For example, after booting, the sensor control unit 161 may initialize and enable the photo sensor unit 110 by loading an operating program stored in the memory unit 150. The sensor control unit 161 may enable the photo sensor unit 110 when the display unit 140 is powered on, and may disable the photo sensor unit 110 when the display unit 140 is powered off or enters into a sleep state.

The pattern recognition part 163 may receive, from the sensor control unit 161, location information about the photo sensors responding to light rays irradiated by the optical pointer 200 and, based on the received information, may determine which pattern is being irradiated. The pattern recognition part 163 may further determine movement of the recognized pattern, based on the received information. For example, if location information about the detected photo sensors indicates a widthwise or lengthwise successive pattern, the pattern recognition part 163 may recognize the irradiated pattern as a bar-type pattern. If the bar pattern changes, the pattern recognition part 163 may further recognize the next pattern movement. The next pattern movement may be, for example, a clockwise or counterclockwise rotation. When at least one of a pattern, a pattern direction, and a pattern movement is detected and recognized, the pattern recognition part 163 may transmit pattern information including the recognized pattern to the function control part 165.

In response to receiving the pattern information from the pattern recognition part 163, the function control part 165 may load the function table stored in the memory unit 150 and may, with reference to the function table 154, control application programs being activated in the device. For example, the function control part 165 may control the display unit 140 to display contents 152 stored in the memory unit 150, depending on the received pattern information. Additionally, depending on the received pattern information, the function control part 165 may, in general, control the output of contents.

As discussed above, the device 100 can recognize the pattern provided by the optical pointer 200 using the sensor control part 161 and the pattern recognition part 163, and can control various functions according to the recognized pattern and corresponding pattern information. Accordingly, a user can easily manage the device 100 at short or long distances by using the optical pointer 200.

Figure 5:
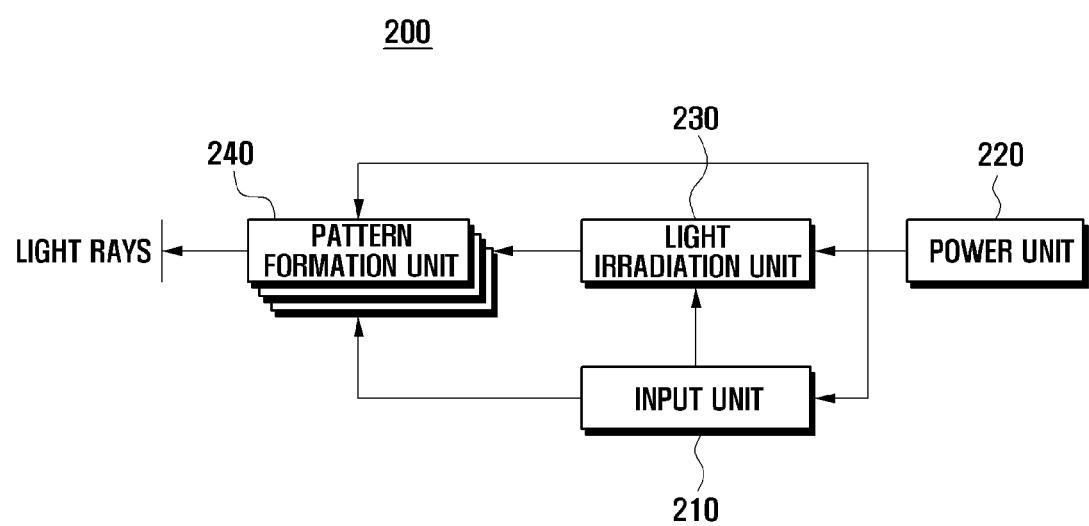
FIG. 5 is a block diagram illustrating a configuration of an optical pointer according to exemplary embodiments of the present invention.

FIG. 5 is a block diagram that illustrates a configuration of an optical pointer according to exemplary embodiments of the present invention.

Referring to FIG. 5, the optical pointer 200 may include an input unit 210, a power unit 220, a light irradiation unit 230, and a pattern formation unit 240.

The input unit 210 may generate an input signal to enable the light irradiation unit 230. The input unit 210 may directly control the power unit 220 according to a user's input, and may generate an input signal for selecting a type of pattern in the pattern formation unit 240. The input unit 210 may be mechanically configured as a switch or as several buttons. In general, any suitable configuration may be used to implement the input unit 210. A user can select one of a plurality of patterns included in the pattern formation unit 240 by manipulating the switch or directly choosing the button corresponding to a user-desired pattern. The input unit 210 may be connected to the power unit 220, the light irradiation unit 230, and the pattern formation unit 240, and may control irradiation of the user's desired pattern. After selection of the user's desired pattern, irradiation of the user's desired pattern may begin immediately.

The power unit 220 can supply electric power to components of the optical pointer 200, and may supply power to necessary components under the control of the input unit 210. For example, the power unit 220 may be connected to the light irradiation unit 230 and the pattern formation unit 240, and can supply a power to the light irradiation unit 230 and the pattern formation unit 240 according to the input signal generated by the input unit 210. In some cases, the power unit 220 may be a battery, or a secondary battery.

When power is supplied by the power unit 220 to the component of the optical pointer 200, the light irradiation unit 230 may generate a controlled amount of light and may emit the light using the pattern formation unit 240. The light irradiation unit 230 may generate laser beams or infrared rays, depending on the characteristics and/or settings of the optical pointer 200.

The pattern formation unit 240 may receive light rays from the light irradiation unit 230 and manipulates the received light rays with the selected pattern. For example, the pattern formation unit 240 may have a structural shape to allow some light rays to be intercepted and some light rays to pass through, thereby forming a pattern of light rays.

Although the above-described optical pointer 200 has both the light irradiation unit 230 and the pattern formation unit 240 to irradiate light rays with a specific pattern, in some cases, a light irradiation unit 230 may generate and irradiate patterned light rays without using a pattern formation unit 240. When no pattern formation unit 240 is used, a light irradiation unit 230 may be a digital type with suitable hardware and software configurations, which may allow replacing configurations of the pattern unit and updating new patterns.

Figure 6:
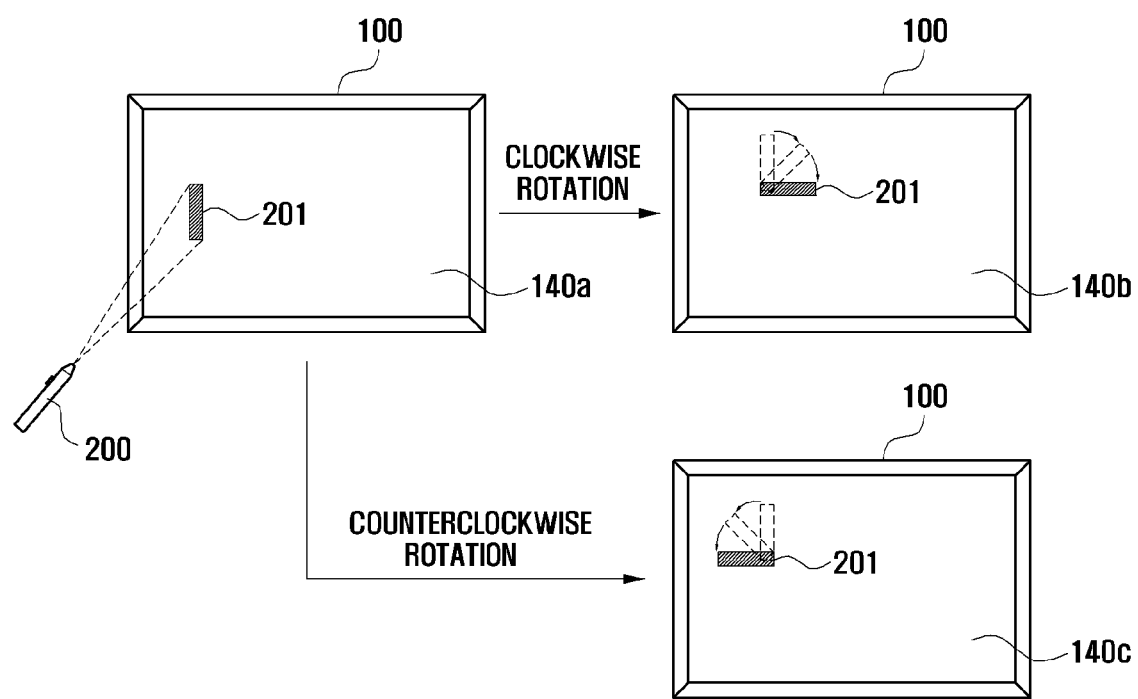
FIG. 6 is an exemplary view illustrating a light irradiation pattern and movement according to exemplary embodiments of the present invention.

FIG. 6 is an exemplary view illustrating a light irradiation pattern and its movement, according to exemplary embodiments of the present invention.

Referring to FIG. 6, after booting, the device 100 may activate the display unit 140 under the control of the control unit 160 and may enable the photo sensor unit 110 disposed on the display unit 140.

Then, as shown in display screen 140a, a bar type pattern 201 may be formed on a partial region of the display unit 140 by the irradiation of light rays from the optical pointer 200. Photo sensors in the photo sensor unit 110 may detect pattern 201 in response to the irradiation of light rays. The sensor control part 161 of the control unit 160 may receive location information on the sensors receiving the light rays. The pattern recognition part 163 of the control unit 160 may recognize, based on the location information provided to the pattern recognition part 163 by the sensor control part 161, that the bar type pattern 201 is formed on the display unit 140. The pattern recognition part 163 may then transmit recognized pattern information to the function control part 165.

After receiving the pattern information from the pattern recognition part 163, the function control part 165 may load the function table 154 in the memory unit 150 and may map the recognized pattern to a function defined in the function table 154. The function control part 165 may then control and/or execute a function corresponding to the function mapped to the recognized pattern. For example, if the function table 154 defines a mapping between a bar type pattern and an image display function, the function control part 165 may control the display unit 140 to display images stored in the memory unit 150.

With respect to the optical pointer 200, a user can move the optical pointer 200 to move the bar type pattern 201. For example, if the user rotates the optical pointer 200 in a clockwise direction, the irradiated pattern 201 may rotate correspondingly, as shown in the display screen 140b. The sensor control part 161 may receive, from photo sensors, new location information corresponding to a new location (e.g., after rotation) of the pattern 201. Additionally, after receiving the new location information, the pattern recognition part 163 may determine that the pattern 201 has rotated clockwise. The pattern recognition part 163 may transmit information about the movement of the pattern 201 to the function control part 165.

The function control part 165 may receive the movement information from the pattern recognition part 163 and may perform a predefined function by referring to the function table 154. For example, when an image is displayed on the display unit 140 in response to a recognition of the pattern 201, the function control part 165 may control the display unit to display a subsequent image in response to, for example, a clockwise rotation of the pattern 201.

In another example, if a user rotates the optical pointer 200 in a counterclockwise direction, the irradiated pattern 201 may rotate correspondingly as shown in the display screen 140c. The sensor control part 161 may receive, from photo sensors, new location information corresponding to a new location (e.g., after rotation) of the pattern 201. After receiving the new location information, the pattern recognition part 163 may determine that the pattern 201 has rotated counterclockwise. The pattern recognition part 163 may then transmit information about the movement of the pattern 201 to the function control part 165.

After receiving the movement information from the pattern recognition part 163, the function control part 165 may perform a predefined function by referring to the function table 154. For example, when an image is displayed on the display unit 140 in response to a recognition of the pattern 201, the function control part 165 may control the display unit 140 to display a preceding image (e.g., previously displayed image) in response to the counterclockwise rotation of the pattern 201.

Although the above described functions are related to image displays and changes in displayed images, exemplary embodiments of the invention are not limited thereto. For example, functions of the device 100 executed according to pattern recognition or pattern movement recognition may include, but are not limited to, a play or control (e.g., pause, fast-forward, rewind, channel switch, broadcast reception blocking) of contents 152 stored in the memory unit.

Figure 7:
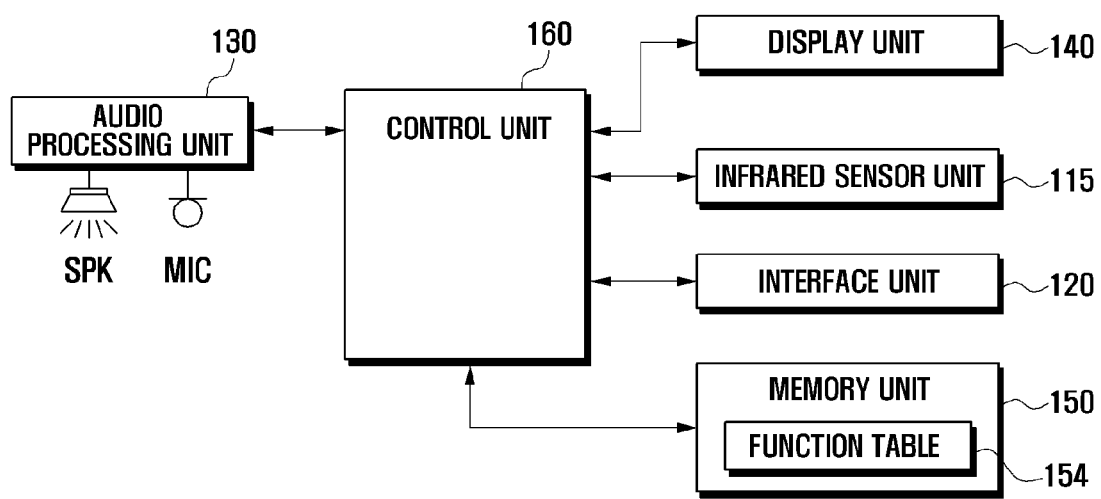
FIG. 7 is a block diagram illustrating a configuration of an electronic device according to exemplary embodiments of the present invention.

FIG. 7 is a block diagram illustrating a configuration of an electronic device 100 according to exemplary embodiments of the present invention.

Referring to FIG. 7, the device 100 may include an infrared sensor unit 115, an interface unit 120, an audio processing unit 130, a display unit 140, a memory unit 150, and a control unit 160. The infrared sensor unit 115 is a type of photo sensor unit 110 described above.

The device 100 may recognize a pattern irradiated on the display unit 140 from the optical pointer 200 by using the infrared sensor unit 115, and may then perform a function corresponding to the recognized pattern. In the following description, elements similar in operation and scope to those described above with reference to FIG. 3, FIG. 4, FIG. 5, and FIG. 6 will be omitted. In the following description, the optical pointer 200 may output infrared rays.

The infrared sensor unit 115 may be a sensor array which receives infrared rays from the optical pointer 200. The infrared sensor unit 115 may be activated at the same time as the display unit 140, may detect infrared rays on the display unit 140, and may transmit a sensing signal to the control unit 160. The infrared sensor unit 115 may monitor the display unit 140 to detect infrared rays transmitted on the display unit 140. The infrared sensor unit 115 may, for example, be disposed at sides or the rear of the display unit 140 and may therefore detect rays incident on the display unit 140 from the optical pointer 200. In general, the infrared sensor unit 115 may be disposed on or around any part of the display unit 140.

The audio processing unit 130 may output an alarm under the control of the control unit 160 when the infrared sensor unit 115 detects infrared rays transmitted from the optical pointer 200 onto the display unit 140.

The memory unit 150 may store application programs for operating the device 100 and contents received from other devices or servers. The memory unit 150 may include a program region and a data region. The program region may store an operating program to, for example, operate the infrared sensor unit 115. When the device 100 is enabled, the operating program may be selectively activated according to predefined conditions or the user's request.

The control unit 160 may control the power supply, the activation of each component in the device 100, and signal flows between the respective components. The control unit 160 may control the infrared sensor unit 115 to selectively operate according to the user's request, and may control execution of functions corresponding to a recognized pattern based on the function table 154. The control unit 160 may include the pattern recognition part 163 and the function control part 165. The pattern recognition part 163 may recognize pattern information corresponding to a pattern of infrared rays detected by the infrared sensor unit 115, a pattern direction, and/or a pattern movement. The function control part 165 may receive the pattern information from the pattern recognition part 163 and may execute, by referring to the function table 154 stored in the memory unit 150, a menu function of the device 100 or control a menu function being executed.

Figure 8:
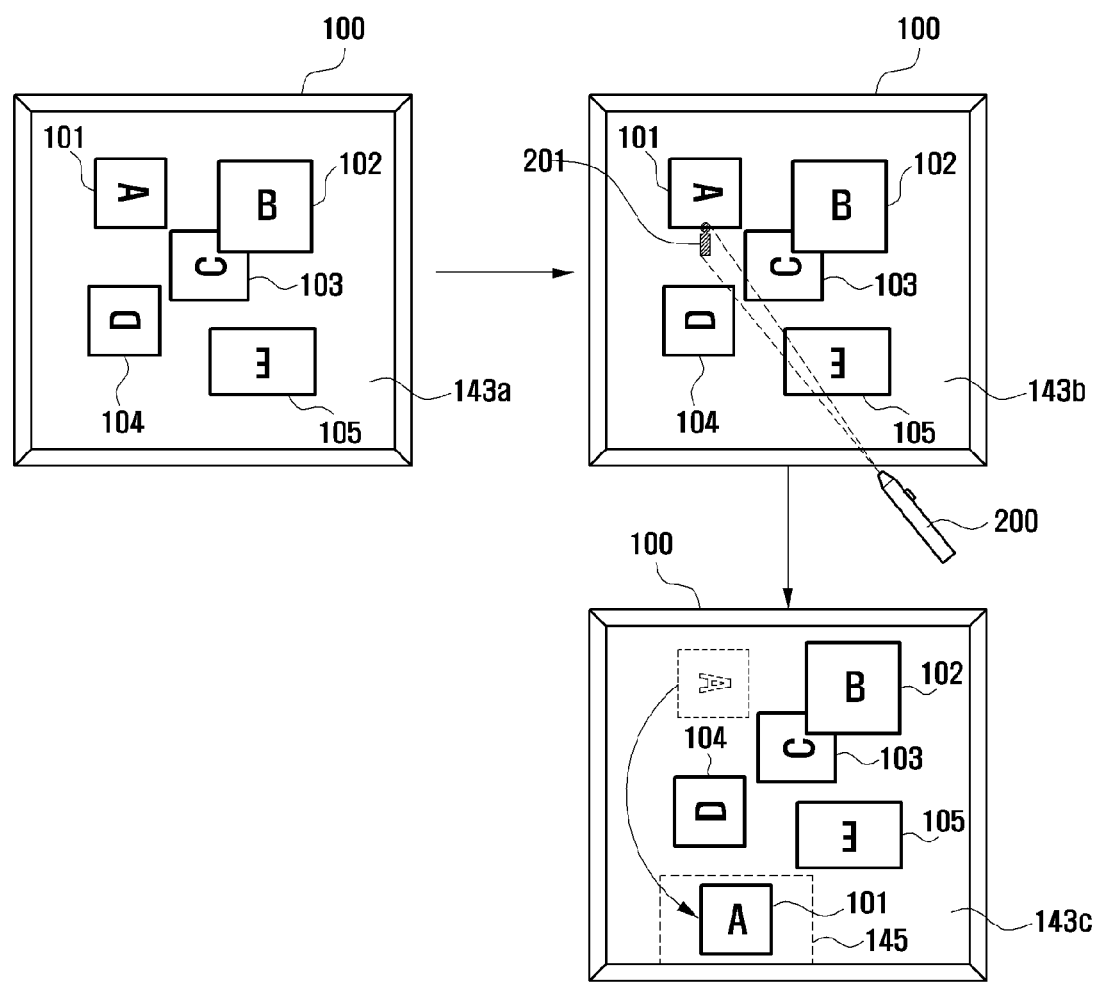
FIG. 8 is an exemplary view illustrating pattern recognition and related operations of an electronic device according to exemplary embodiments of the present invention.

FIG. 8 is an exemplary view illustrating pattern recognition and related operations of the device 100 according to exemplary embodiments of the present invention.

Referring to FIG. 8, after booting, the device 100 may activate and enable the display unit 140 and infrared sensor unit 115, respectively, under control of the control unit 160. When receiving a user's request, the device 100 may output contents 101, 102, 103, 104 and 105 or icons corresponding to the contents 101, 102, 103, 104, and 105. The contents 101, 102, 103, 104, and 105 may be stored in the memory unit 150 or received through the interface unit 120, as shown in the display screen 143a of the display unit 140. Each content 101, 102, 103, 104 and 105 (or corresponding icons) may have the same or different orientation when displayed on the display unit 140. For example, content 101 has a rightward orientation, content 102 may have an upward orientation, content 103 and content 104 may have a leftward orientation, and content 105 may have a downward orientation. The orientation of a content (or corresponding icons) may refer to the direction an upper side of the content faces. For example, since content 102 is displayed in an upward direction on the display unit 140, a user looking at the content 102 from a lower or bottom side of the display unit 140 can view content 102 without a need to rotate the content 102.

When contents 101, 102, 103, 104 and 105 are displayed as shown in the display screen 143b of the display unit 140, the user can point the optical pointer 200 at a content, for example, content 101. A pattern provided by the optical pointer 200 on the display unit 140 may be a directional pattern 201 corresponding to a direction. For example, the directional pattern 201 may be shaped like a bar, which has a long and straight body. A semicircular end may be formed at one side of the bar. The directional pattern 201 may be irradiated onto the display unit 140 according to the movement of the optical pointer 200. The directional pattern 201 may not be limited to a specific form and may have various forms or shapes suitable for directional discrimination.

As shown in the display screen 143c of the display unit 140, a directional pattern 201 may overlap content displayed on the display unit 140. Content overlapped with the directional pattern 201 may be transferred to another area. For example, content 101 when overlapped with the directional pattern 201 may be transferred to area 145 of the display unit 140. Areas, such as area 145, may be allotted near all sides of the display unit 140 and may be selected depending on the direction of the directional pattern 201 when the optical pointer 200 moves. For example, if the directional pattern 201 having an upward direction moves like a 'drag' action, content 101 may be moved to area 145 near the bottom of the display unit 140. In general, allotted areas for moving content into may be provided in any suitable area of the display unit 140. During or after transfer of content into an area, the transferred content (e.g., content 101) may rotate into a different orientation, for example, an upward orientation.

According to another example, if a content (e.g., content 102) is overlapped with the directional pattern 201 from a right side of the display unit 140, the second content 102 may be transferred to an area on the right side of the display unit 140. A semicircular end of the directional pattern 201 may be facing a left direction indicating that the directional pattern 201 may have a leftward direction. Accordingly, after being transferred to the an area on the right side of the display unit 140, the second content 102 may then rotate thereby having a leftward orientation. As described in this example, the transfer of content to an area of the display unit 140 may depend on the direction of the directional pattern 201 and may not be associated with a location of the optical pointer 200. If the directional pattern tilts from a specific direction by a predetermined angle or less, the device 100 may maintain the transfer of content in a specific direction by accepting such a tilt as being within an allowable margin of error.

The device 100 may be very effective when a number of users work individually and can transfer contents in and out of areas on the display unit 140 that have been designated as individual work areas.

As described hereinabove, an input system for an electronic device 100 according to exemplary embodiments of the present invention may control a specific function of the device 100 at short and/or long distances by using pattern information including at least one of a pattern of light rays irradiated from an optical pointer, a pattern direction, and a pattern movement.

Figure 9:
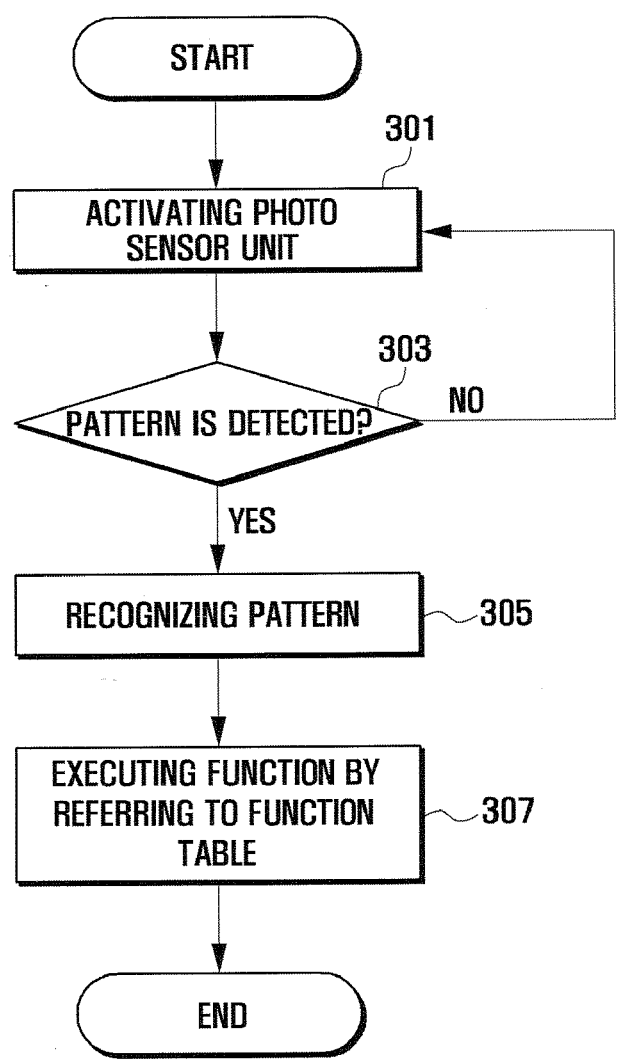
FIG. 9 is a flow diagram illustrating an input method for an electronic device according to exemplary embodiments of the present invention.

FIG. 9 is a flow diagram illustrating an input method for an electronic device 100 according to exemplary embodiments of the present invention.

Referring to FIG. 9, the device 100 may be started by switching on the power and booting start up programs. After the booting, the device 100 may output a predefined idle screen on the display unit 140. The device 100 may activate and enable the photo sensor unit 110 (step 301). The photo sensor unit may have a plurality of photo sensors and, in some cases, may be an infrared sensor unit.

Next, the sensor control part 161 may monitor the photo sensor unit 110 in the display unit 140 and may determine which photo sensors are detecting light rays irradiated from the optical pointer 200. Location information of the photo sensors receiving the light rays may be provided to the sensor control part 161. The sensor control part may then provide the location information to the pattern recognition unit 163, which may determine, using the location information, if a pattern is detected (step 303). If no pattern is detected in step 303, the device 100 may maintain the activated photo sensor unit 110 (step 301) until a pattern is detected.

If a pattern is detected, the pattern recognition part 163 may recognize and determine the detected pattern (step 305).

After the pattern recognition and determination, the function control part 165 may receive information of the recognized pattern from the pattern recognition part 163, and may refer to the function table 154 stored in the memory unit 120 to execute a function corresponding to the recognized pattern (step 307). The function control part 165 may load the function table 154 in the memory unit 120 and then determine the function corresponding to the recognized pattern. Examples of executing a function include playback of a content stored in the memory unit or activating a broadcast receiving module.

In some cases, if the recognized pattern has a specific direction orientation, the device 100 may perform, by referring to the function table 154, a specific control function depending on the direction of the recognized pattern. For example, if the recognized pattern is a directional pattern having an arrow facing towards a right direction on the display unit 140 and the recognized pattern overlaps an audio file in an audio file list, the device 100 may play the audio file. If, for example, the device 100 recognizes a right-directional arrow during playback of the audio file, the device 100 may play a next file in the audio file list. The above-described examples are exemplary only and are not to be considered as limiting exemplary embodiments of the present invention.

Figure 10:
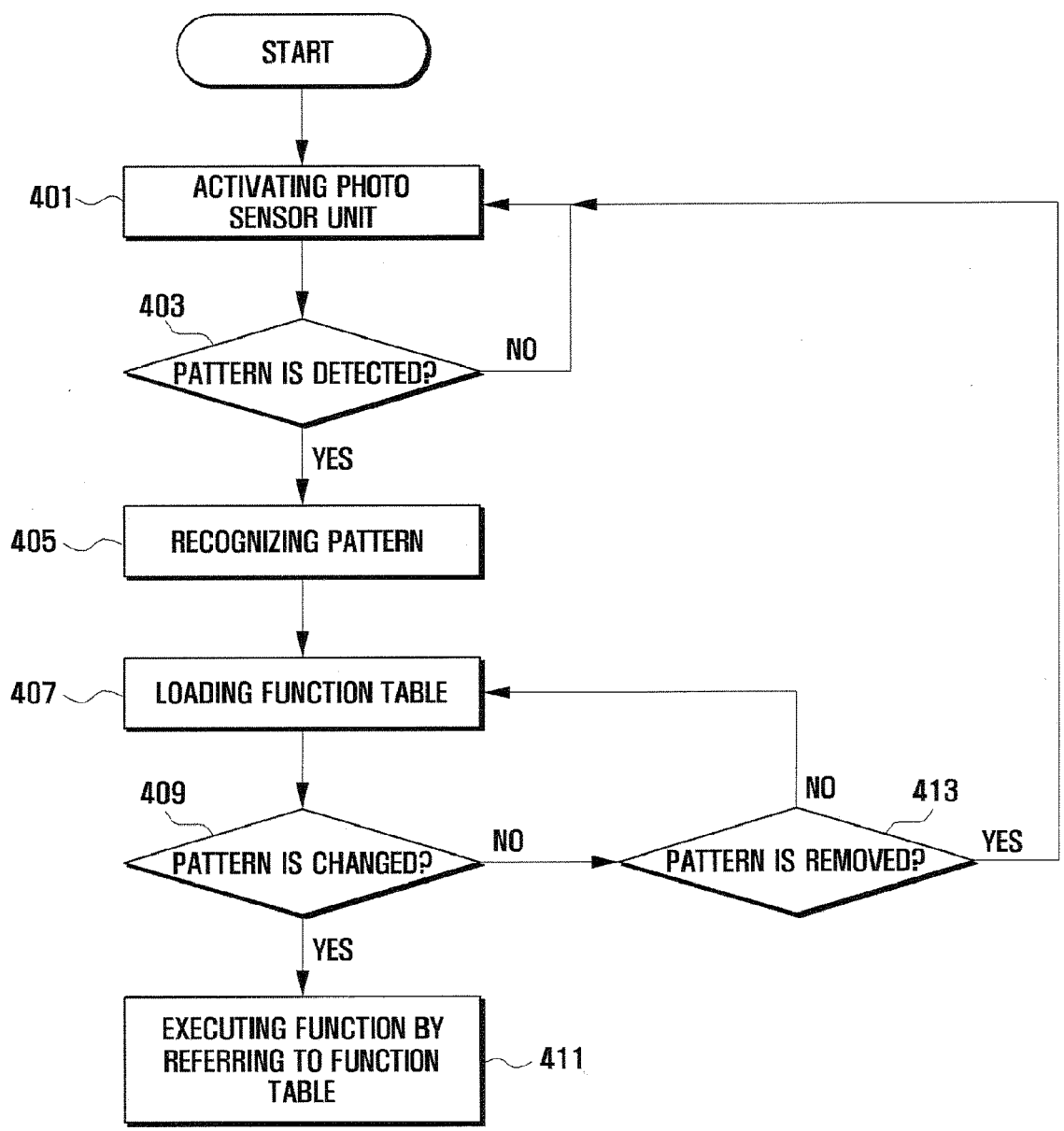
FIG. 10 is a flow diagram illustrating an input method for an electronic device according to exemplary embodiments of the present invention.

FIG. 10 is a flow diagram illustrating an input method for an electronic device 100 according to exemplary embodiments of the present invention.

Referring to FIG. 10, the device 100 may be started by switching on the power and booting start up programs. The device 100 may then output a predefined idle screen on the display unit 140. The device 100 may then activate and enable the photo sensor unit 110 (step 401). The photo sensor unit 110 may have a plurality of photo sensors and, in some cases, may be an infrared sensor unit.

Next, the sensor control part 110 may monitor the photo sensor unit 110 in the display unit 140 to determine which photo sensors are detecting light rays irradiated from the optical pointer 200 Location information of the photo sensors receiving the light rays may be provided to the sensor control part 161. The sensor control part may then provide the location information to the pattern recognition unit 163, which may determine, using the location information, if a pattern is detected (step 403). If no pattern is detected in step 403, the device may maintain the activated photo sensor unit 110 (step 401) until a pattern is detected.

If a pattern is detected in step 403, the pattern recognition part 163 may recognize and determine the detected pattern (step 405).

After the pattern recognition and determination, the function control part 165 may receive information of the recognized pattern from the pattern recognition part 163, and may search for the function table 154 in the memory unit 140 and load the function table 154 for reference to execute a function corresponding to the recognized pattern (step 407).

Next, the device 100 may determine whether the pattern has changed (step 409). For example, the sensor control part 161 may successively transmit location information of photo sensors detecting light rays. Accordingly, the pattern recognition part 163 may determine a change in location information of a pattern. The pattern recognition part 163 may transmit pattern change information to the function control part 165.

Next, the function control part 165 may execute a function corresponding to the pattern change by referring to the function table (step 411). For example, when slide images are displayed on the display unit 140, the device 100 may output the next image or the preceding image according to the direction of a pattern change. For instance, if a bar-type pattern is recognized and rotates clockwise, the device 100 may display the next image in slide images on the display unit 140. If the bar-type pattern is rotated counterclockwise, the device 100 may output the preceding image in slide images on the display unit 140.

If the device 100 outputs a broadcast program, the device 100 may perform a channel switch or a volume regulation according to the direction of the pattern change. For example, if a bar-type pattern is recognized and rotates clockwise, the device 100 may switch the channel to the next channel or increase a volume of the device 100. If the bar-type pattern rotates counterclockwise, the device 100 may switch the channel to the preceding channel or decrease the volume.

If the pattern recognition part 163 fails to receive a change in location information in step 409, the pattern recognition part 163 may determine whether the recognized pattern is removed from the display unit 140 (step 413). If the pattern is removed, the device 100 may return to step 401. If the pattern is not removed, the device 100 may return to step 407.

As described above, an input method and system for an electronic device may execute a function of the electronic device or control a function being executed according to a type or movement of a pattern of light rays irradiated from an optical pointer.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An input method for an electronic device, the method comprising:
   detecting a movement of a pattern of light signals transmitted from an optical pointer as a pattern movement of signals sensed by a plurality of photo sensors, on a display unit;
   referencing a function table providing a mapping between a function of the device and pattern information associated with the pattern movement; and
   executing the function according to the pattern information and the function table.

2. The method of claim 1, wherein detecting pattern movement comprises:
   activating the plurality of photo sensors disposed between pixels in the display unit;
   determining first photo sensors of the plurality of photo sensors detecting the light signals;
   receiving location information of the first photo sensors; and
   generating and transmitting the pattern information, the pattern information comprising the location information.

3. The method of claim 1, wherein detecting the pattern movement comprises:
   detecting infrared rays irradiated on the display unit by sensing at least a portion of the display unit; and generating the pattern information according to the detected infrared rays.

4. The method of claim 1, wherein executing the function comprises at least one of:
- executing a function from among a plurality of menu functions of the device; and
- controlling a function among the menu functions of the device, the function being executed on the device during detection of the pattern movement.

5. The method of claim 1, wherein executing the function comprises differently controlling the function according to the movement of the pattern movement.

6. The method of claim 1, wherein detecting the pattern movement comprises:
- detecting the pattern irradiated on at least one content displayed on the display unit; and
- determining the pattern movement.

7. The method of claim 6, wherein executing the function comprises transferring the at least one content overlapping with the pattern to a determined area of the display unit according to the pattern movement.

8. The method of claim 7, wherein executing the function further comprises rotating the at least one content transferred to the determined area.

9. An input system for an electronic device, the system comprising:
- an optical pointer configured to transmit light signals; and
- a device configured to detect a movement of a pattern of light signals transmitted from the optical pointer as a pattern movement sensed by a plurality of photo sensors, configured to reference a function table providing a mapping between a function of the device and pattern information associated with the pattern movement, and configured to execute or control the function according to the pattern information and the function table.

10. The system of claim 9, wherein the device comprises:
- a display unit comprising pixels;
- a photo sensor unit comprising the plurality of photo sensors disposed between the pixels;
- a sensor control part configured to determine first photo sensors of the plurality of photo sensors detecting the light signals;
- a pattern recognition part configured to receive the pattern information comprising location information of the first photo sensors; and
- a function control part configured to execute or control the function according to the pattern information.

11. The system of claim 9, wherein the device comprises:
- a display unit comprising pixels;
- an infrared sensor unit configured to detect infrared rays irradiated on the display unit from the optical pointer;
- a pattern recognition part configured to receive the pattern information; and
- a function control part configured to execute or control on the function according to the pattern information.

12. The system of claim 10, wherein the function control part is further configured to execute or control the function according to the pattern movement.

13. The system of claim 10, wherein the pattern recognition part is further configured to determine overlapping of the pattern with the at least one content displayed on the display unit, and to determine the pattern movement.

14. The system of claim 13, wherein the function control part is further configured to transfer the at least one content overlapping with the pattern to a determined area of the display unit according to the pattern movement.

15. The system of claim 14, wherein the at least one content is rotated in the determined area.

16. The system of claim 9, wherein the optical pointer comprises:
- a power unit configured to supply power;
- a light irradiation unit configured to transmit the light signals; and
- an input unit configured to activate the light irradiation unit by controlling the power unit and configured to determine the pattern according to a user input.

* * * * *